United States Patent
Yu et al.

(10) Patent No.: US 8,559,394 B2
(45) Date of Patent: Oct. 15, 2013

(54) ACTIVE HANDOVER METHOD AND TERMINAL BASED ON HIGH RATE PACKET DATA SYSTEM

(75) Inventors: Yuanfang Yu, Shenzhen (CN); Xiaowu Zhao, Shenzhen (CN); Yonggang Fang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 211 days.

(21) Appl. No.: 13/143,858

(22) PCT Filed: Sep. 15, 2009

(86) PCT No.: PCT/CN2009/073950
§ 371 (c)(1),
(2), (4) Date: Jul. 8, 2011

(87) PCT Pub. No.: WO2010/078764
PCT Pub. Date: Jul. 15, 2010

(65) Prior Publication Data
US 2011/0274089 A1    Nov. 10, 2011

(30) Foreign Application Priority Data
Jan. 9, 2009    (CN) .......................... 2009 1 0000140

(51) Int. Cl.
*H04W 4/00*    (2009.01)
(52) U.S. Cl.
USPC ....................................................... 370/331
(58) Field of Classification Search
None
See application file for complete search history.

(56) References Cited

U.S. PATENT DOCUMENTS

| 2009/0022104 A1* | 1/2009 | Cherian et al. ................. 370/331 |
| 2009/0129339 A1* | 5/2009 | Young et al. ................... 370/331 |
| 2010/0278150 A1* | 11/2010 | Park et al. ..................... 370/332 |

FOREIGN PATENT DOCUMENTS

| CN | 101098546 | 1/2008 |
| WO | WO 2008/044215 | 4/2008 |

OTHER PUBLICATIONS

3GPP, Technical Specification Group Services and System Aspects; Architecture enhancements for non-3GPP accesses (Release 8), TS 23.402 V8.1.1, Mar. 2008, Section 9.3.
Peng, Zhiwei et al., "The evolution from CDMA 2000 to LTE", ZTE Technologies (News), Jul. 2008, No. 7, Section 2, figure 4.
International Search Report for International Patent Application No. PCT/CN2009/073950 dated Dec. 24, 2009.

* cited by examiner

*Primary Examiner* — John Blanton
(74) *Attorney, Agent, or Firm* — Pearl Cohen Zedek; Latzer Baratz, LLP (57) ABSTRACT

An active handover method and terminal based on the HRPD system are disclosed by the present invention. The method comprises that: a terminal receives an active handover command, wherein if a virtual connection has existed, the virtual connection is disconnected; and if a virtual connection is being established, the establishment process of the virtual connection is terminated; and High Rate Packet Data air interface connection is established. With the method, processing of the access terminal and the access network is specified, and the problem of long-time interruption in the service of the terminal is solved, processing efficiency of the access terminal and the access network can be improved, thereby improving the processing efficiency of the whole system.

19 Claims, 4 Drawing Sheets

ACTIVE HANDOVER METHOD AND TERMINAL BASED ON HIGH RATE PACKET DATA SYSTEM

CROSS-REFERENCE TO RELATED APPLICATIONS

This application is a National Phase Application of PCT International Patent Application No. PCT/CN2009/073950, International Filing Date Sep. 15, 2009, claiming priority of Chinese Patent Application No. 200910000140.8, filed Jan. 9, 2009 which is hereby incorporated by reference in its entirety.

FIELD OF THE INVENTION

The present invention relates to communication field, and in particular to an active handover method and a terminal based on High Rate Packet Data (referred to as HRPD) system.

BACKGROUND OF THE INVENTION

At present, the interoperation between subsequent evolution network of Code Division Multiple Access (referred to as CDMA) network and Long Term Evolution (referred to as LTE) network is a trend in network development. However, it will be a complex substitution process for the evolvement from the commercial CDMA network to the LTE network, and in the substitution process, there will be long-period coexistence of the two networks, during which the two kinds of wireless networks will be interconnected.

Regarding handover of an access terminal from the LTE system to the HRPD system (i.e. LTE-HRPD interoperation), when the access terminal is handed over from the LTE system to the HRPD system, considering delaying sensitive services (e.g. VoIP service for voice transmission on IP network), the access terminal needs to pre-register HRPD through the LTE system, and establish HRPD session and IP session.

At present, in order to reduce modifications of the existing Legacy HRPD protocol stack as much as possible, and shield the impact on the different specific wireless access techniques brought by high-level protocol, in the LTE-HRPD interoperation specifications, a virtual connection is defined for the transmission of data and messages. Moreover, in the connection layer specification of the LTE-HRPD interoperation specifications, Signaling Adaptation Protocol is defined for air connection management under a tunnel mode, i.e. establishment and release of virtual connection are performed through the Signaling Adaptation Protocol.

At present, during the active handover from the LTE system to the HRPD system, the access terminal sends a HRPD air interface connection establishment request to the access network, at this time, if is a virtual connection exists or a virtual connection is being established, as for the access network, there already exists a link connection, therefore the access network will not accept the connection establishment request, and will refuse the HRPD air interface connection establishment request from the access terminal, and this will lead to a failure in active handover; and as for the access terminal, since the wireless environment changes, the LTE signals are not sufficient to support the service transmission and the request of handover to the HRPD system is refused by the access network, in this case as there is no wireless coverage available, the service of the access terminal is made to be interrupted.

Thus, during the process of handover of an access terminal from the LTE system to the HRPD system, if a virtual connection has existed or a virtual connection is being established, the data processing of the access terminal and the access network will be made disordered, which will cause a long-time interruption in the service of the access terminal and affect processing efficiency of the access terminal and the access network, thereby affecting the processing efficiency of the whole system.

SUMMARY OF THE INVENTION

The present invention is provided in view of the problem that handover between systems causes a long-time interruption in the service of a terminal, and further affects processing efficiency of the access terminal and the access network and the processing efficiency of the whole system. Thus, the main object of the present invention is to provide an active handover method and a terminal based on HRPD system to solve the problem.

According to one aspect of the present invention, an active handover method based on High Rate Packet Data system is provided, and the method can be used in handover of a terminal from a source system to the High Rate Packet Data system.

The active handover method based on High Rate Packet Data system according to the present invention comprises: a terminal receiving an active handover command, in which if a virtual connection has existed, it disconnects the virtual connection; and if a virtual connection is being established, it terminates the establishment process of the virtual connection; and establishing High Rate Packet Data air interface connection.

Wherein, when a virtual connection has existed or when a virtual connection is being established, a HRPD Signaling Adaptation Protocol module of the terminal is in a non-closed state, wherein the non-closed state includes: an open state indicating that the virtual connection has already existed, and an establishment state indicating that the virtual connection is being established; then, disconnecting the virtual connection or terminating the establishment process of the virtual connection includes: transferring the HRPD Signaling Adaptation Protocol module to a closed state.

Further, the method further comprises: if the virtual connection does not exist, triggering the establishment of HRPD air interface connection, wherein when the virtual connection does not exist, the HRPD Signaling Adaptation Protocol module of the terminal is in the closed state.

Wherein if the HRPD Signaling Adaptation Protocol module is in the establishment state, the processing of transferring the HRPD Signaling Adaptation Protocol module to a closed state comprises at least one of the following: the HRPD Signaling Adaptation Protocol module sending a notification indicative of closing the virtual connection; the HRPD Signaling Adaptation Protocol module disenabling an opening confirmation timer of the virtual connection; and sending a virtual connection blocking request message to the access network by the HRPD Signaling Adaptation Protocol module.

Wherein if the HRPD Signaling Adaptation Protocol module is in the open state, the processing of transferring the HRPD Signaling Adaptation Protocol module to a closed state comprises at least one of the following: the HRPD Signaling Adaptation Protocol module sending a notification indicating that the virtual connection is closed; the HRPD Signaling Adaptation Protocol module disenabling the closing confirmation timer of the virtual connection; and the HRPD Signaling Adaptation Protocol module sending a virtual connection closing request message to the access network.

Further, after the terminal receives the active handover command, the method further comprises: the HRPD Signaling Adaptation Protocol module setting a tunnel mode enabling field thereof to be an identification value indicative of active handover.

Further, if the terminal fails in establishing the HRPD air interface connection, the method further comprises: the HRPD Signaling Adaptation Protocol module setting a tunnel mode enabling field thereof to be an identification value of using the source system's tunnel, and sending a notification indicative of failure in the HRPD air interface connection.

Wherein, the terminal is a dual mode terminal which at least supports the HRPD system.

According to one aspect of the present invention, a terminal is provided.

The terminal according to the present invention comprises: a receiving module, configured to receive an active handover command; a Signaling Adaptation Protocol module, configured to control a virtual connection; a judging module, configured to judge whether a HRPD Signaling Adaptation Protocol module is in a closed state; a transferring module, configured to transfer the HRPD Signaling Adaptation Protocol module to a closed state; an establishing module, configured to establish a HRPD air interface connection; a calling module, configured to call the transferring module and the establishing module in the case where the judging result of the judging module is NO, and call the establishing module in the case where the judging result of the judging module is YES.

With at least one of the above technical solutions of the present invention, after receiving an active handover command, the terminal disconnects a virtual connection or terminates a virtual connection being established, and triggers the establishment of a HRPD air interface connection, which specifies processing of the access terminal and the access network, solves the problem of long-time interruption in the service of the terminal, and can improve processing efficiency of the access terminal and the access network, thereby improving the processing efficiency of the whole system.

BRIEF DESCRIPTION OF THE ACCOMPANYING DRAWINGS

The drawings herein are used to provide a further understanding of the present invention and form a part of the specification, which are used to explain the present invention together with embodiments of the present invention without unduly limiting the scope of the present invention.

In the accompanying drawings.

DETAILED DESCRIPTION OF THE PREFERRED EMBODIMENTS

Brief Description of Functions

As mentioned above, the problem of long-time interruption in the service of an access terminal exists in the prior art, for example, when an active handover occurs, if a virtual connection is during the process of establishment or has been established, how to process the virtual connection; and when the terminal is during the process of session negotiation of the pre-register process, due to the rapid change in wireless environment, the terminal has to be handed over from LTE to HRPD, at this time, if the virtual connection has been established and a HRPD connection needs to be established, then how to process the virtual connection. On the basis of the prior art, there is no explicit description about virtual connection processing under active handover, but the present invention provides an active handover solution based on a HRPD system, which solves the problem of long-time interruption in the service of the access terminal by the way that the terminal disconnects the virtual connection or terminates the establishment process of virtual connection after receiving an active handover command, so as to improve processing efficiency of the access terminal and the access network.

The embodiments of the present invention and the features of the embodiments can be combined with each other if there is no conflict.

The present invention will be described in detail in conjunction with the figures.

Method Embodiment

According to an embodiment of the present invention, an active handover method based on the HRPD system is provided.

Figure 1:
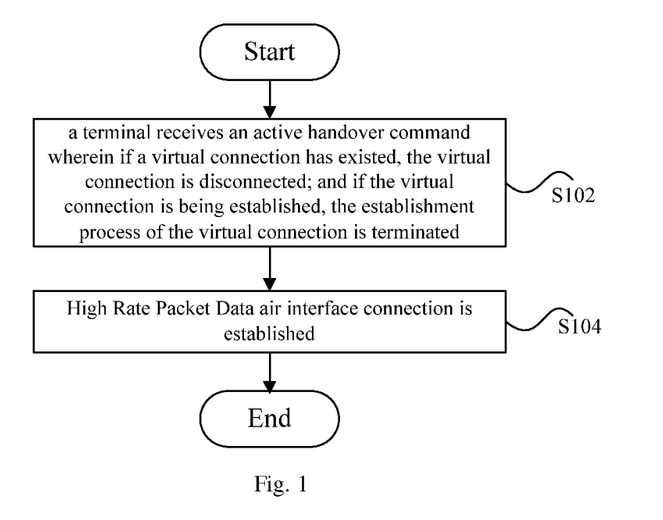
FIG. 1 is a flowchart of an active handover method based on the HRPD system according to a method embodiment of the present invention.

FIG. 1 is a flowchart of an active handover method based on the HRPD system according to an embodiment of the present invention. It shall be explained that, for the convenience of description, the technical solution of the method embodiment of the present invention is shown and described in FIG. 1 in the form of steps, and the steps shown in FIG. 1 can be carried out in, for example, a computer system of a set of computer executable instructions. Although FIG. 1 illustrates the logical order, in some cases, the illustrated or described steps may be carried out in an order different from the one described herein. As illustrated in FIG. 1, the method is used in handover of a terminal from a source system to the High Rate Packet Data system, and comprises the following steps (Step S102 to Step S104).

Step S102, a terminal receives an active handover command wherein if a virtual connection has existed (viz. the establishment of a virtual connection has been accomplished), the virtual connection is disconnected; and if the virtual connection is being established, the establishment process of the virtual connection is terminated, wherein the terminal is a dual mode terminal which at least supports the HRPD system, for example, the terminal may be either a dual mode terminal based on the LTE system and the HRPD system, or a dual mode terminal based on the WIMAX system and the HRPD system.

Step S104, High Rate Packet Data air interface connection is established.

In the above step S102, if the virtual connection does not exist, the terminal directly triggers the establishment of the HRPD air interface connection.

In specific implementation process, there is corresponding relationship between the state of the virtual connection and the state of a HRPD Signaling Adaptation Protocol module of the terminal. For example, the fact that a virtual connection has existed and the fact that the virtual connection is being established both correspond to the HRPD Signaling Adaptation Protocol module being in a non-closed state, and the fact that the virtual connection does not exist corresponds to the HRPD Signaling Adaptation Protocol module being in a closed state. That is, the non-closed state of the HRPD Signaling Adaptation Protocol module includes: an open state indicating that the virtual connection has already existed, and an establishment state indicating that the virtual connection is being established, and the closed state of the HRPD Signaling Adaptation Protocol module includes: a closed state indicating that the virtual connection is closed (block or disconnected).

Hereinafter, taking the dual mode terminal based on the LTE system and the HRPD system as an example, the handover of the terminal from the LTE system to the HRPD system is described in detail as follows.

The terminal is under the coverage of the LTE system, and is in an active state, viz. the terminal is in a service connection state (for example, the terminal is in communication state). If the terminal needs to be handed over from the LTE system to the HRPD system, the HRPD Signaling Adaptation Protocol module for controlling the virtual connection in the terminal will receive an active handover command, and the HRPD Signaling Adaptation Protocol module will set its tunnel mode enabling field to be an identification value indicative of active handover. Then, the subsequent operations need to be performed according to the state of the HRPD Signaling Adaptation Protocol module, wherein the state of the HRPD Signaling Adaptation Protocol module includes: a closed state indicating that the virtual connection is closed, an open state indicating that the establishment of the virtual connection has been accomplished, and an establishment state indicating that the virtual connection is being established. The subsequent operations are described for the different states.

Case 1: if the HRPD Signaling Adaptation Protocol module is in a closed state, the terminal directly triggers the establishment of the HRPD air interface connection.

Case 2: if the HRPD Signaling Adaptation Protocol module is in an establishment state, the HRPD Signaling Adaptation Protocol module is transferred to a closed state, and then the HRPD air interface connection is established. Specifically, the operation for transferring the HRPD Signaling Adaptation Protocol module to a closed state can comprise at least one of the following: the HRPD Signaling Adaptation Protocol module sending a notification indicative of closing the virtual connection to other modules of the terminal (for example, an address management protocol module, and a session configuration protocol module of the terminal, etc); the HRPD Signaling Adaptation Protocol module disenabling the opening confirmation timer of the virtual connection; and the HRPD Signaling Adaptation Protocol module sending a virtual connection closing request message to the access network.

Case 3: if the HRPD Signaling Adaptation Protocol module is in an open state, the HRPD Signaling Adaptation Protocol module is transferred to a closed state, and then the HRPD air interface connection is established. Specifically, the operation for transferring the HRPD Signaling Adaptation Protocol module to a closed state may comprise at least one of the following: the HRPD Signaling Adaptation Protocol module sending a notification indicating that the virtual connection is closed to other modules of the terminal (for example, an address management protocol module, and a session configuration protocol module of the terminal, etc); the HRPD Signaling Adaptation Protocol module disenabling the closing confirmation timer of the virtual connection; and the HRPD Signaling Adaptation Protocol module sending a virtual connection closing request message to the access network.

In addition, in the above three cases, if the terminal fails in establishing the HRPD air interface connection, viz. the HRPD Signaling Adaptation Protocol module receives a connection failure indication from an idle state protocol module, the HRPD Signaling Adaptation Protocol module will set its tunnel mode enabling field to be a tunnel mode of the source system, and send a notification indicative of failure in the HRPD air interface connection to other modules of the terminal (for example, a high-level protocol module of the terminal, etc).

By means of the technical solution provided in the embodiment of the present invention, after receiving an active handover command, the terminal disconnects a virtual connection or terminates the establishment process of a virtual connection, which solves the problem of long-time interruption in the service of the terminal, and can improve processing efficiency of the access terminal and the access network, thereby improving the processing efficiency of the whole system.

Figure 2:
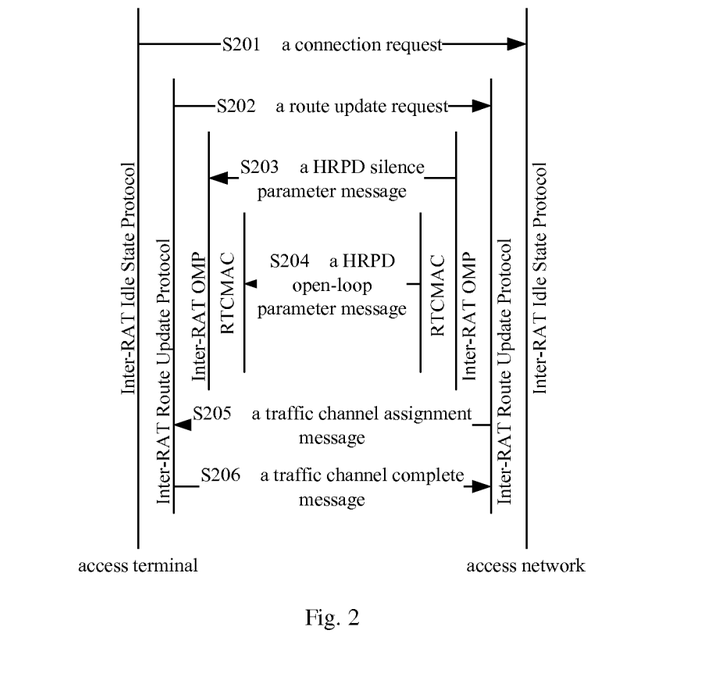
FIG. 2 is a flowchart of establishment of a HRPD air interface connection under a tunnel mode according to an embodiment of the present invention.

The process of establishing the HRPD air interface connection is described in conjunction with FIG. 2. As illustrated in FIG. 2, the following processing (Step S201 to Step S206) is included.

Step S201, the access terminal sends ConnectionRequest (connection request) to the access network through an interoperation idle state protocol (Inter-RAT Idle State Protocol).

Step S202, the access terminal sends RouteUpdate (route update request) to the access network through an interoperation route update protocol (Inter-RAT Route Update Protocol).

Step S203, the access network sends HRPDSilenceParameters (HRPD silence parameter message) to the access terminal through an interoperation overhead message protocol (Inter-RAT OMP).

Step S204, the access network sends HRPDOpenLoopParameters (HRPD open-loop parameter message) to the access terminal through reverse traffic channel medium access control (RTCMAC).

Step S205, the access network sends TrafficChannelAssignment (traffic channel assignment message) to the access terminal.

Step S206, the access terminal sends TrafficChannelComplete (traffic channel complete message) to the access network through an interoperation route update protocol (Inter-RAT Route Update Protocol).

The active handover method of the terminal from a source system to a HRPD system provided in the present invention is described in conjunction with specific examples as follows. It shall be explained that the application situations of the following examples are: the access terminal is under the coverage of the source system, and the access terminal is in an active state, that is, the access terminal is in a service connection state (for example, the access terminal is in a communication state), the access terminal comprises a HRPD Signaling Adaptation Protocol module for controlling the virtual connection. Moreover, in the following examples, the HRPD Signaling Adaptation Protocol module will deactivate $T_{SAPALCloseConf}$, when sending a virtual connection closing (blocking or disconnecting) indication.

EXAMPLE 1

Figure 3:
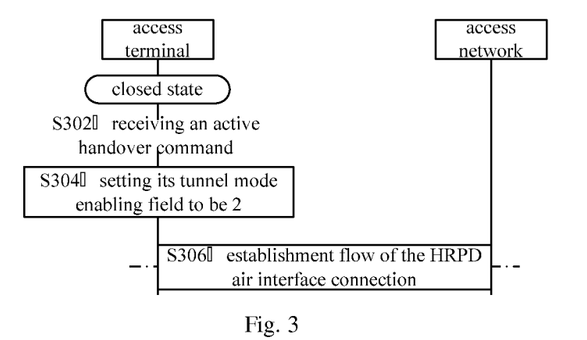
FIG. 3 is a flowchart of active handover when the Signaling Adaptation Protocol module is in a closed state according to an embodiment of the present invention.

FIG. 3 is a flowchart of active handover when the Signaling Adaptation Protocol module is in a closed state according to the method embodiment of the present invention. As illustrated in FIG. 3, the method comprises the following steps (Step S302 to Step S306).

Step S302, the HRPD Signaling Adaptation Protocol module of the access terminal is in a closed state, and the HRPD Signaling Adaptation Protocol module receives an active handover command.

Step S304, the HRPD Signaling Adaptation Protocol module sets its tunnel mode enabling field to be 2.

Step S306, the access terminal triggers connection establishment flow of the HRPD air interface connection under a tunnel mode, wherein the connection establishment flow of the HRPD air interface connection is as shown in FIG. 2 and not to be described in detail here.

EXAMPLE 2

Figure 4:
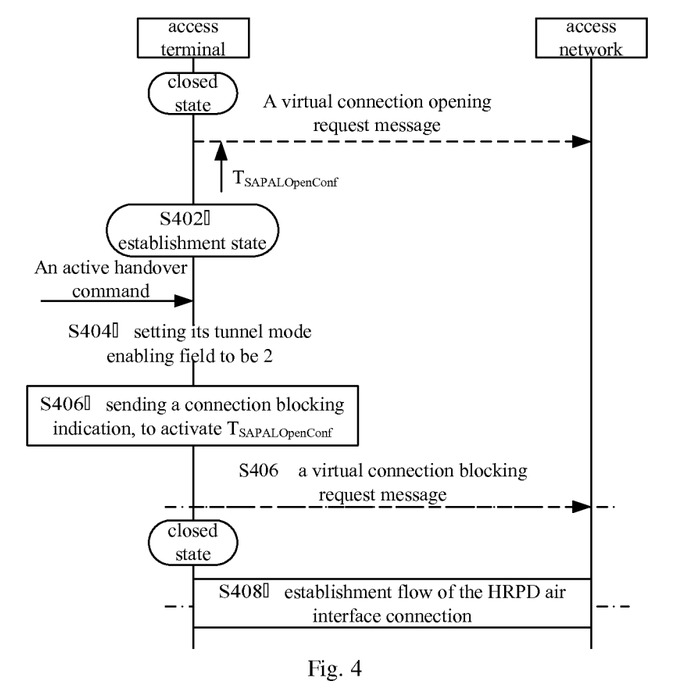
FIG. 4 is a flowchart of active handover when the Signaling Adaptation Protocol module is in an establishment state according to an embodiment of the present invention.

FIG. 4 is a flowchart of active handover when the Signaling Adaptation Protocol module is in an establishment state according to the method embodiment of the present invention. As illustrated in FIG. 4, the method comprises the following steps (Step S402 to Step S408).

Step S402, the HRPD Signaling Adaptation Protocol module of the access terminal is in a closed state, wherein by sending a virtual connection opening request message to the HRPD Signaling Adaptation Protocol module, the timer is set to wait for a virtual connection opening confirmation message from the access network, and the HRPD Signaling Adaptation Protocol module is transferred to the establishment state.

Step S404, the Signaling Adaptation Protocol module of the access terminal receives an active handover command, and the HRPD Signaling Adaptation Protocol module sets its tunnel mode enabling field to be 2.

Step S406, the HRPD Signaling Adaptation Protocol module sends a virtual connection closing indication, and the HRPD Signaling Adaptation Protocol module is transferred to a closed state, which specifically includes: the HRPD Signaling Adaptation Protocol module sending a notification indicative of closing the virtual connection to other modules of the terminal (for example, an address management protocol module, and a session configuration protocol module of the terminal, etc); the HRPD Signaling Adaptation Protocol module disenabling the opening confirmation timer of the virtual connection; and the HRPD Signaling Adaptation Protocol module sending a virtual connection closing request message to the access network.

Step S408, the access terminal triggers connection establishment flow of the HRPD air interface connection under a tunnel mode, wherein the connection establishment flow of the HRPD air interface connection is as shown in FIG. 2 and not to be described in detail here.

EXAMPLE 3

Figure 5:
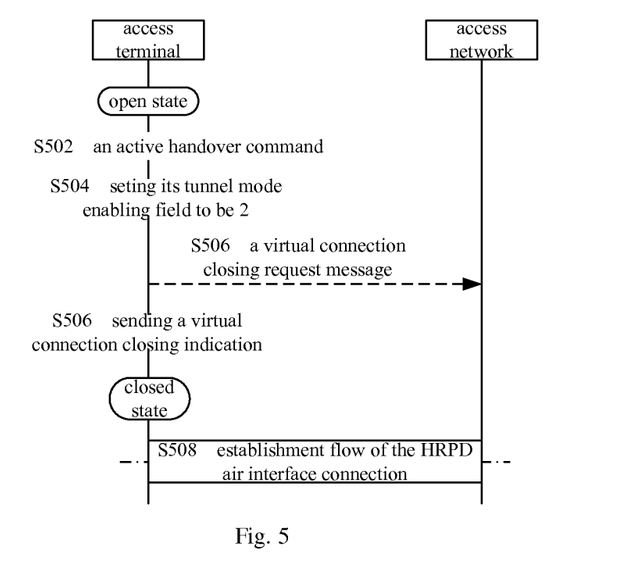
FIG. 5 is a flowchart of active handover when the Signaling Adaptation Protocol module is in an open state according to an embodiment of the present invention.

FIG. 5 is a flowchart of active handover when the Signaling Adaptation Protocol module is in an open state according to the method embodiment of the present invention. As illustrated in FIG. 5, the method comprises the following steps (Step S502 to Step S508).

Step S502, the HRPD Signaling Adaptation Protocol module of the access terminal is in an open state, and the HRPD Signaling Adaptation Protocol module of the access terminal receives an active handover command.

Step S504, the HRPD Signaling Adaptation Protocol module sets its tunnel mode enabling field to be 2.

Step S506, the HRPD Signaling Adaptation Protocol module sends a virtual connection closing indication, and the HRPD Signaling Adaptation Protocol module is transferred to a closed state, which specifically includes: the HRPD Signaling Adaptation Protocol module sending a notification indicative of closing the virtual connection to other modules of the terminal (for example, an address management protocol module, and a session configuration protocol module of the terminal, etc); the HRPD Signaling Adaptation Protocol module disenabling the closing confirmation timer of the virtual connection; and the HRPD Signaling Adaptation Protocol module sending a virtual connection closing request message to the access network.

Step S508, the access terminal triggers connection establishment flow of the HRPD air interface connection under a tunnel mode, wherein the connection establishment flow of the HRPD air interface connection is as shown in FIG. 2 and not described in detail here.

EXAMPLE 4

Figure 6:
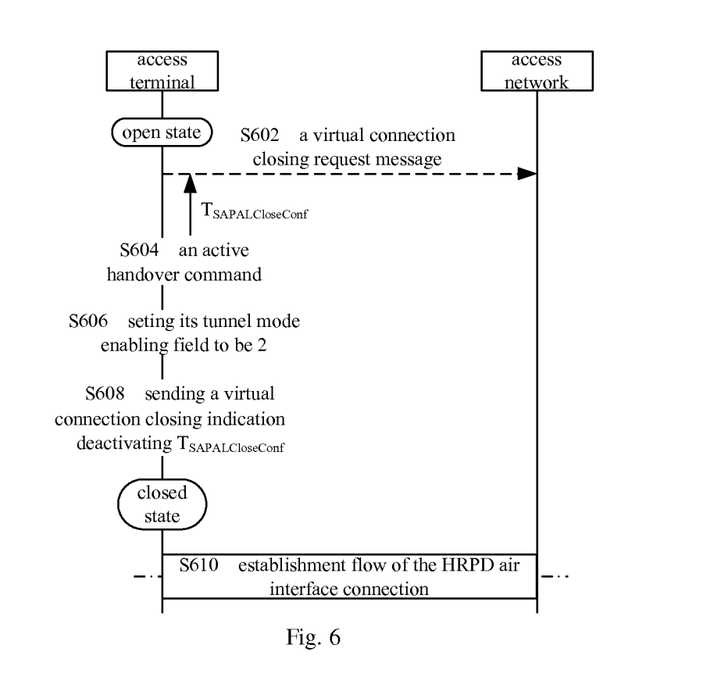
FIG. 6 is a flowchart of active handover when the Signaling Adaptation Protocol module is in an open state and is about to close the virtual connection according to an embodiment of the present invention.

FIG. 6 is a flowchart of active handover when the Signaling Adaptation Protocol module is in an open state according to the method embodiment of the present invention. It should be noted that the situation may occur after the access terminal finishes and submits HPRD pre-register by the LTE system, and at the time the release of the virtual connection will be triggered. As illustrated in FIG. 6, the method comprises the following steps (Step S602 to Step S610).

Step S602, the HRPD Signaling Adaptation Protocol module of the access terminal is in an open state and about to close the virtual connection, the HRPD Signaling Adaptation Protocol module sends a virtual connection closing request message to the access network, and sets the timer to wait for a virtual connection closing confirmation message from the access network.

Step S604, the HRPD Signaling Adaptation Protocol module of the access terminal receives an active handover command.

Step S606, the HRPD Signaling Adaptation Protocol module sets its tunnel mode enabling field to be 2.

Step S608, the HRPD Signaling Adaptation Protocol module sends a virtual connection closing indication, and the HRPD Signaling Adaptation Protocol module is transferred to a closed state, which specifically includes: the HRPD Signaling Adaptation Protocol module sending a notification indicating that the virtual connection is closed to other modules of the terminal (for example, an address management protocol module, and a session configuration protocol module of the terminal, etc); the HRPD Signaling Adaptation Protocol module disenabling the closing confirmation timer of the virtual connection; and the HRPD Signaling Adaptation Protocol module sending a virtual connection closing request message to the access network.

Step S610, the access terminal triggers connection establishment flow of the HRPD air interface connection under a tunnel mode, wherein the connection establishment flow of the HRPD air interface connection is as shown in FIG. 2 and not to be described in detail here.

Apparatus Embodiment

According to an embodiment of the present invention, a terminal is provided.

Figure 7:
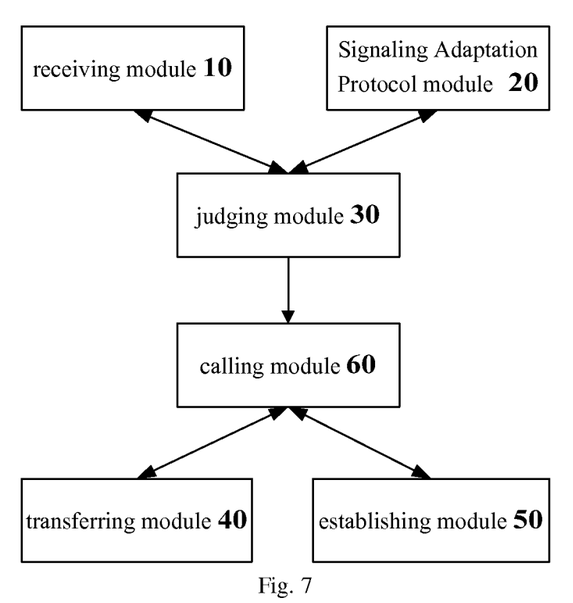
FIG. 7 is a structure block diagram of a terminal according to an apparatus embodiment of the present invention.

FIG. 7 illustrates the structure of the terminal according to an embodiment of the present invention. As illustrated in FIG. 7, the terminal comprises a receiving module 10, a Signaling Adaptation Protocol module 20, a judging module 30, a transferring module 40, an establishing module 50, and a calling module 60.

The receiving module 10 is configured to receive an active handover command; the Signaling Adaptation Protocol module 20 is configured to control a virtual connection; the judging module 30 is connected to the receiving module 10 and the Signaling Adaptation Protocol module 20, and is configured to judge whether the Signaling Adaptation Protocol module 20 is in a closed state after the receiving module 10 receives an active handover command; the transferring module 40 is configured to transfer the HRPD Signaling Adaptation Protocol module 20 to a closed state; the establishing module 50 is configured to establish a HRPD air interface connection; and the calling module 60 is connected to the judging module 30, the transferring module 40 and the establishing module 50, and is configured to call the transferring module 40 and the establishing module 50 in the case where the judging result of the judging module 30 is NO, and call the establishing module 50 in the case where the judging result of the judging module 30 is YES.

By means of the terminal provided in the embodiment of the present invention, after receiving an active handover command, the terminal transfers the Signaling Adaptation Protocol module to a closed state, which solves the problem of long-time interruption in the service of the terminal in the system handover process and can improve processing efficiency of the access terminal and the access network, thereby improving the processing efficiency of the whole system.

As mentioned above, by means of the active handover method and/or the terminal based on the HRPD system according to the present invention, the active handover processing under LTE-HRPD interoperation is specified, viz. after receiving an active handover command, the terminal disconnects a virtual connection or terminates the establishment process of a virtual connection, solving the problem of long-time interruption in the service of the terminal, improving processing efficiency of the access terminal and the access network, thereby the processing efficiency of the whole system is improved.

Above description is only to illustrate the preferred embodiments but not to limit the present invention. Various alterations and changes to the present invention are apparent to those skilled in the art. The scope defined in claims shall cover any modification, equivalent substitution and improvement within the spirit and principle of the present invention.

What is claimed is:

1. An active handover method based on a High Rate Packet Data system, applied in handover of a terminal from a source system to the High Rate Packet Data system, the method comprises:
   the terminal receiving an active handover command, in which if a virtual connection has existed, it disconnects the virtual connection; and if the virtual connection is being established, it terminates the establishment process of the virtual connection; and
   establishing High Rate Packet Data air interface connection;
   wherein,
   when a virtual connection has existed or when a virtual connection is being established, a HRPD Signaling Adaptation Protocol module of the terminal is in a non-closed state, wherein the non-closed state includes: an open state indicating that the virtual connection has already existed, and an establishment state indicating that the virtual connection is being established;
   the step of disconnecting the virtual connection or terminating the establishment process of the virtual connection includes: transferring the HRPD Signaling Adaptation Protocol module to a closed state; and
   if the virtual connection does not exist, triggering the establishment of HRPD air interface connection, wherein when the virtual connection does not exist, the HRPD Signaling Adaptation Protocol module of the terminal is in the closed state.

2. The method according to claim 1, wherein if the HRPD Signaling Adaptation Protocol module is in the establishment state, the processing of transferring the HRPD Signaling Adaptation Protocol module to a closed state comprises at least one of the following:
   the HRPD Signaling Adaptation Protocol module sending a notification indicative of closing the virtual connection;
   the HRPD Signaling Adaptation Protocol module disenabling an opening confirmation timer of the virtual connection; and
   sending a virtual connection closing request message to the access network by the HRPD Signaling Adaptation Protocol module.

3. The method according to claim 2, wherein after the terminal receiving the active handover command, the method further comprises:
   the HRPD Signaling Adaptation Protocol module setting a tunnel mode enabling field thereof to be an identification value indicative of active handover.

4. The method according to claim 2, wherein if the terminal fails in establishing the HRPD air interface connection, the method further comprises:
   the HRPD Signaling Adaptation Protocol module setting a tunnel mode enabling field thereof to be an identification value of using the source system's tunnel, and sending a notification indicative of failure in the HRPD air interface connection.

5. The method according to claim 2, wherein, the terminal is a dual mode terminal which at least supports the HRPD system.

6. The method according to claim 1, wherein if the HRPD Signaling Adaptation Protocol module is in the open state, the processing of transferring the HRPD Signaling Adaptation Protocol module to a closed state comprises at least one of the following:
   the HRPD Signaling Adaptation Protocol module sending a notification indicating that the virtual connection is closed;
   the HRPD Signaling Adaptation Protocol module disenabling a closing confirmation timer of the virtual connection; and
   the HRPD Signaling Adaptation Protocol module sending a virtual connection closing request message to the access network.

7. The method according to claim 6, wherein after the terminal receiving the active handover command, the method further comprises:
   the HRPD Signaling Adaptation Protocol module setting a tunnel mode enabling field thereof to be an identification value indicative of active handover.

8. The method according to claim 6, wherein if the terminal fails in establishing the HRPD air interface connection, the method further comprises:
the HRPD Signaling Adaptation Protocol module setting a tunnel mode enabling field thereof to be an identification value of using the source system's tunnel, and sending a notification indicative of failure in the HRPD air interface connection.

9. The method according to claim 6, wherein, the terminal is a dual mode terminal which at least supports the HRPD system.

10. The method according to claim 1, wherein after the terminal receiving the active handover command, the method further comprises:
the HRPD Signaling Adaptation Protocol module setting a tunnel mode enabling field thereof to be an identification value indicative of active handover.

11. The method according to claim 1, wherein if the terminal fails in establishing the HRPD air interface connection, the method further comprises:
the HRPD Signaling Adaptation Protocol module setting a tunnel mode enabling field thereof to be an identification value of using the source system's tunnel, and sending a notification indicative of failure in the HRPD air interface connection.

12. The method according to claim 1, wherein, the terminal is a dual mode terminal which at least supports the HRPD system.

13. The method according to claim 1, wherein after the terminal receiving the active handover command, the method further comprises:
the HRPD Signaling Adaptation Protocol module setting a tunnel mode enabling field thereof to be an identification value indicative of active handover.

14. The method according to claim 1, wherein if the terminal fails in establishing the HRPD air interface connection, the method further comprises:
the HRPD Signaling Adaptation Protocol module setting a tunnel mode enabling field thereof to be an identification value of using the source system's tunnel, and sending a notification indicative of failure in the HRPD air interface connection.

15. The method according to claim 1, wherein, the terminal is a dual mode terminal which at least supports the HRPD system.

16. The method according to any of claim 1, wherein after the terminal receiving the active handover command, the method further comprises:
the HRPD Signaling Adaptation Protocol module setting a tunnel mode enabling field thereof to be an identification value indicative of active handover.

17. The method according to claim 1, wherein if the terminal fails in establishing the HRPD air interface connection, the method further comprises:
the HRPD Signaling Adaptation Protocol module setting a tunnel mode enabling field thereof to be an identification value of using the source system's tunnel, and sending a notification indicative of failure in the HRPD air interface connection.

18. The method according to claim 1, wherein the terminal is a dual mode terminal which at least supports the HRPD system.

19. A terminal, comprising:
a receiving module, configured to receive an active handover command;
a Signaling Adaptation Protocol module, configured to control a virtual connection;
a judging module, configured to judge whether the HRPD Signaling Adaptation Protocol module is in a closed state;
a transferring module, configured to transfer the HRPD Signaling Adaptation Protocol module to a closed state;
an establishing module, configured to establish a HRPD air interface connection;
a calling module, configured to call the transferring module and the establishing module in the case where the judging result of the judging module is NO, and call the establishing module in the case where the judging result of the judging module is YES; and
a processor, configured to execute the receiving module, the signaling adaptation protocol module, the judging module, the transferring module, the establishing module and the calling module.

* * * * *